(12) United States Patent
Tanaka

(10) Patent No.: US 12,130,174 B2
(45) Date of Patent: Oct. 29, 2024

(54) OPTICAL FIBER SENSING SYSTEM AND METHOD FOR ABNORMAL OCCURRENCE DETECTION

(71) Applicant: NEC Corporation, Tokyo (JP)

(72) Inventor: Toshiaki Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 310 days.

(21) Appl. No.: 17/760,845

(22) PCT Filed: Sep. 27, 2019

(86) PCT No.: PCT/JP2019/038134
§ 371 (c)(1),
(2) Date: Mar. 16, 2022

(87) PCT Pub. No.: WO2021/059477
PCT Pub. Date: Apr. 1, 2021

(65) Prior Publication Data
US 2022/0341774 A1 Oct. 27, 2022

(51) Int. Cl.
*G01H 9/00* (2006.01)
*G08B 13/12* (2006.01)

(52) U.S. Cl.
CPC .......... *G01H 9/004* (2013.01); *G08B 13/124* (2013.01)

(58) Field of Classification Search
None
See application file for complete search history.

(56) References Cited

U.S. PATENT DOCUMENTS

2006/0197665 A1* 9/2006 Shibata ................ G08B 13/186
398/21
2006/0197865 A1 9/2006 Shibata et al.

FOREIGN PATENT DOCUMENTS

| JP | 2006-208061 A | | 8/2006 |
|---|---|---|---|
| JP | 2006-209575 A | | 8/2006 |
| JP | 2012-118004 A | | 6/2012 |
| JP | 2016-152525 A | | 8/2016 |
| JP | 2016152525 | * | 8/2016 |
| JP | 2017-134674 A | | 8/2017 |
| KR | 20160052993 A | | 5/2016 |

OTHER PUBLICATIONS

International Search Report for PCT Application No. PCT/JP2019/038134, mailed on Dec. 17, 2019.
Wellbrock, A. Glenn. "First Field Trial of Sensing Vehicle Speed, Density, and Road Conditions by using Fiber Carrying High Speed Data", IEEE, Apr. 25, 2019, pp. 1-3.

* cited by examiner

*Primary Examiner* — Brandi N Hopkins
*Assistant Examiner* — Nigel H Plumb

(57) ABSTRACT

An optical fiber sensing system for abnormal occurrence detection includes a receiving unit configured to receive an optical signal from an optical fiber for sensing. The system includes an identifying unit configured to identify an occurrence of an event and a type of the event that has occurred based on a vibration pattern included in the optical signal. The system includes an acquiring unit configured to acquire a detection condition pertaining to a period corresponding to the type of the event identified by the identifying unit. The system includes a determining unit configured to determine that the event identified by the identifying unit is an anomaly if the detection condition is satisfied.

12 Claims, 11 Drawing Sheets

Fig. 5

| DISTANCE FROM DEVICE | Region |
|---|---|
| A~A' km | A |
| A'~A" km | A' |
| A"~B km | A" |
| B~B' km | B |
| B'~B" km | B' |
| B"~C km | B" |
| C~C' km | C |
| C'~C" km | C' |
| C"~D km | C" |

OPTICAL FIBER SENSING SYSTEM AND METHOD FOR ABNORMAL OCCURRENCE DETECTION

This application is a National Stage Entry of PCT/JP2019/038134 filed on Sep. 27, 2019, the contents of all of which are incorporated herein by reference, in their entirety.

TECHNICAL FIELD

The present disclosure relates to optical fiber sensing systems, monitoring methods, and non-transitory computer-readable media.

BACKGROUND ART

In recent years, there exist systems that monitor buildings, sites, or the like (e.g., Patent Literature 1).

According to Patent Literature 1, how an optical fiber swings when an intruder climbs a fence or ladders a fence to climb thereover differs from how an optical fiber swings due to other factors such as wind or snow in terms of, for example, the magnitude of wavelength shift in detected backscattering light or the timing of such wavelength shift. Focusing on this point, the technique disclosed in Patent Literature 1 distinguishes intrusions from other factors by recognizing, for example, the magnitude of wavelength shift in backscattering light in an optical fiber.

CITATION LIST

Patent Literature

Patent Literature 1: Japanese Unexamined Patent Application Publication No. 2006-208061

SUMMARY OF INVENTION

Technical Problem

The technique disclosed in Patent Literature 1, however, is silent as to identification of an event caused by an intruder based on a dynamic change in a vibration pattern.

Furthermore, a person, such as an intruder, can generate a plurality of types of events, and there exists an event that cannot be determined to be an anomaly based on a single vibration but that needs to be determined to be an anomaly when the vibration continues over a certain period.

For example, in a case where a tunnel runs directly under a buried optical fiber, an event where a person walks inside the tunnel can be detected through a single instance of walking. Yet, if this tunnel is an unknown tunnel, the existence of this unknown tunnel cannot be determined definitively based only on a single instance of walking. However, when this walking continues to occur discretely over a certain period, one can determine that it is highly likely that an unknown tunnel exists, and consequently, the event where a person moves inside a tunnel can be determined to be an anomaly that suggests the likelihood that an unknown tunnel exits.

In this manner, among various events, there exists an event that can be determined to be an anomaly only upon detecting vibrations continuing over a certain period. However, the technique disclosed in Patent Literature 1 has shortcomings in that even when such an event has been detected, the technique cannot determine whether the detected event is an anomaly.

In addressing such shortcomings, the present disclosure is directed to providing an optical fiber sensing system, a monitoring method, and a non-transitory computer-readable medium that each can determine whether an event is an anomaly when this event can be determined to be an anomaly only upon detecting vibrations continuing over a certain period.

Solution to Problem

An optical fiber sensing system according to one aspect includes:
  a receiving unit configured to receive an optical signal from an optical fiber for sensing;
  an identifying unit configured to identify an occurrence of an event and a type of the event that has occurred based on a vibration pattern included in the optical signal;
  an acquiring unit configured to acquire a detection condition pertaining to a period corresponding to the type of the event identified by the identifying unit; and
  a determining unit configured to determine that the event identified by the identifying unit is an anomaly if the detection condition is satisfied.

A monitoring method according to one aspect includes:
  a receiving step of receiving an optical signal from an optical fiber for sensing;
  an identifying step of identifying an occurrence of an event and a type of the event that has occurred based on a vibration pattern included in the optical signal;
  an acquiring step of acquiring a detection condition pertaining to a period corresponding to the type of the event identified in the identifying step; and
  a determining step of determining that the event identified in the identifying step is an anomaly if the detection condition is satisfied.

A non-transitory computer-readable medium according to one aspect is a non-transitory computer-readable medium storing a program that causes a computer to execute:
  a receiving procedure of receiving an optical signal from an optical fiber for sensing;
  an identifying procedure of identifying an occurrence of an event and a type of the event that has occurred based on a vibration pattern included in the optical signal;
  an acquiring procedure of acquiring a detection condition pertaining to a period corresponding to the type of the event identified in the identifying procedure; and
  a determining procedure of determining that the event identified in the identifying procedure is an anomaly if the detection condition is satisfied.

Advantageous Effects of Invention

The above aspects yield an advantageous effect of being able to provide an optical fiber sensing system, a monitoring method, and a non-transitory computer-readable medium that each can determine whether an event is an anomaly when this event can be determined to be an anomaly only upon detecting vibrations continuing over a certain period.

BRIEF DESCRIPTION OF DRAWINGS

FIG. 5 illustrates an example of a correspondence table stored in a storage unit according to the second example embodiment.

DESCRIPTION OF EMBODIMENTS

Figure 1:
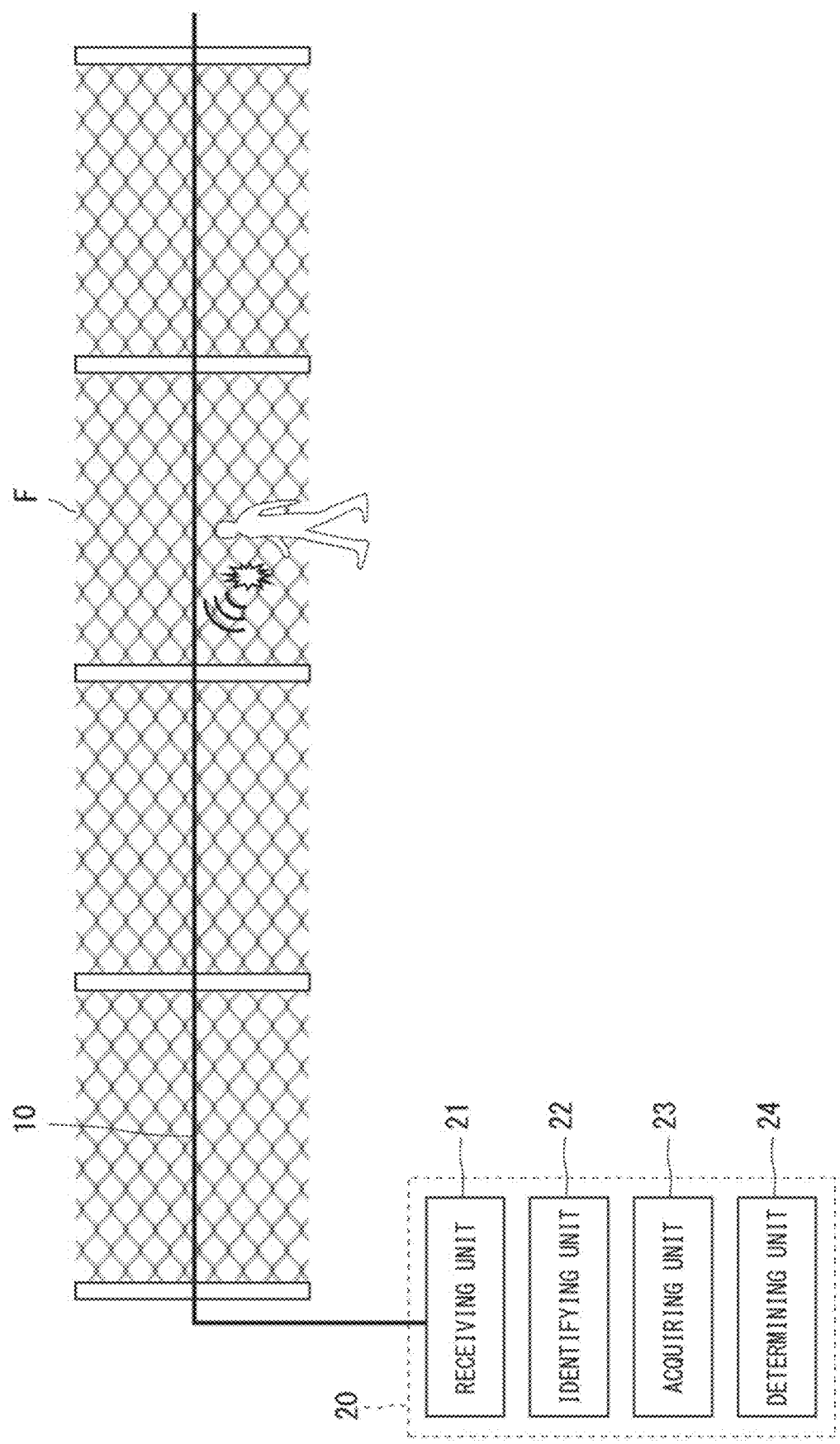
FIG. 1 illustrates an example of a configuration of an optical fiber sensing system according to a first example embodiment.

Hereinafter, some example embodiments of the present disclosure will be described with reference to the drawings. In the following description and drawings, omissions and simplifications are made, as appropriate, to make the description clearer. In the drawings, identical elements are given identical reference characters, and their repetitive description will be omitted, as necessary. According to the example embodiments described hereinafter, a monitoring area includes a fence installed along a boundary line, such as a national boundary, and an area surrounding the fence, but a monitoring area is not limited to this example.

First Example Embodiment

First, with reference to FIG. 1, a configuration of an optical fiber sensing system according to a first example embodiment will be described.

As illustrated in FIG. 1, the optical fiber sensing system according to the first example embodiment is for monitoring a fence F and its surrounding area. The optical fiber sensing system includes an optical fiber 10 and an optical fiber sensing device 20. The optical fiber sensing device 20 includes a receiving unit 21, an identifying unit 22, an acquiring unit 23, and a determining unit 24.

The optical fiber 10 is an optical fiber for sensing that is laid on the fence F, and one end or both ends of the optical fiber 10 are connected to the receiving unit 21 of the optical fiber sensing device 20. How the optical fiber 10 is laid, however, is not limited to this example. For example, a part of the optical fiber 10 may be laid on the fence F, and the remaining part of the optical fiber 10 may be buried underground around the fence F. Alternatively, the optical fiber 10 may be entirely buried underground around the fence F. It is not limited that the optical fiber 10 is provided linearly, and the optical fiber 10 may be provided so as to meander in a plane parallel to the ground surface. Moreover, a plurality of optical fibers 10 may be provided.

The receiving unit 21 causes pulsed light to enter the optical fiber 10. Then, via the optical fiber 10, the receiving unit 21 receives, as returning light (an optical signal), reflected light or scattered light generated as the pulsed light travels in the optical fiber 10.

The fence F vibrates in response to an occurrence of an event where, for example, a person grabs and shakes the fence F. The vibration of the fence F is propagated to the optical fiber 10, and this vibration causes the wavelength of returning light traveling in the optical fiber 10 to change. Accordingly, the optical fiber 10 can detect the vibration of the fence F.

According to the first example embodiment, the assumption is that, for example, the following types of events may occur at the fence F and its surrounding area.

(1) A person grabs and shakes the fence F.
(2) A person hits the fence F.
(3) A person climbs the fence F.
(4) A person ladders the fence F and climbs the ladder.
(5) A person or an animal walks around the fence F.
(6) A vehicle, a motorcycle, or a train runs around the fence F.
(7) A person digs a tunnel around the fence F.
(8) A person or the like moves inside a tunnel around the fence F.

A vibration pattern of a vibration of the fence F propagated to the optical fiber 10 is a varying pattern that varies dynamically, and different vibration patterns are observed for different types of events that occur at the fence F and its surrounding area.

Therefore, returning light that travels in the optical fiber 10 includes a vibration pattern corresponding to the type of the event occurring at the fence F and its surrounding area. Vibration patterns are unique patterns that differ from each other in terms of the magnitude of the vibration, the location of the vibration, how the number of vibrations varies, and so on.

Figure 2:
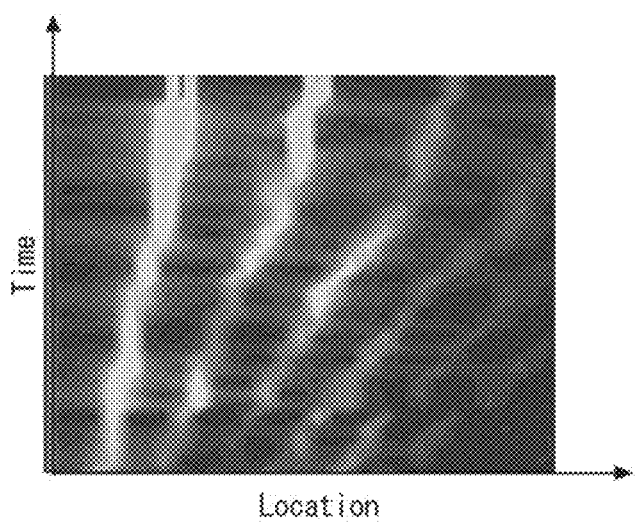
FIG. 2 illustrates an example of sensing data generated by an identifying unit according to the first example embodiment.

For example, the identifying unit 22 generates sensing data, such as the one illustrated in FIG. 2, based on returning light that the receiving unit 21 has received from the optical fiber 10. Thus, the identifying unit 22 can acquire the vibration pattern included in the returning light. In FIG. 2, the horizontal axis represents the location on the optical fiber 10 (the distance from the optical fiber sensing device 20), and the vertical axis represents the lapse of time. The location on the optical fiber 10 can be identified based, for example, on the time difference between the time when pulsed light has entered the optical fiber 10 and the time when the returning light has been received from the optical fiber 10.

The sensing data illustrated in FIG. 2 includes a vibration pattern that varies dynamically, and this vibration pattern differs depending on the type of the event occurring at the fence F and its surrounding area. Therefore, the identifying unit 22 identifies an occurrence of an event at the fence F and its surrounding area and the type of the event that has occurred by analyzing the dynamic change in the vibration pattern included in the sensing data illustrated in FIG. 2.

Moreover, the identifying unit 22 identifies the location on the optical fiber 10 where that vibration pattern has arisen as the location of occurrence where that event has occurred.

Furthermore, the identifying unit 22 may identify the direction in which an event has occurred based on a vibration pattern included in returning light received from the optical fiber 10. For example, in a case where a plurality optical fibers 10 are provided, the identifying unit 22 can identify the direction in which an event has occurred based on a time-series change in the vibration pattern included in returning light received from each of the optical fibers 10. Moreover, in a case where the optical fiber 10 is provided so as to meander in a plane parallel to the ground surface, the identifying unit 22 can identify the direction in which an event has occurred based on a time-series change in the vibration pattern included in returning light received from each location on the optical fiber 10. Moreover, in a case where the fence F is installed along a national boundary, the identifying unit 22 may identify the country from which an event is approaching the national boundary based on the direction in which the event is occurring and the magnitude of the vibration. Furthermore, the identifying unit 22 may determine only an event approaching the national boundary in a specific direction to be an anomaly.

The identifying unit 22 may identify an event occurring at the fence F and its surrounding area by use of pattern matching. For example, for the types of events to be identified, the identifying unit 22 stores in advance into a storage unit (not illustrated) vibration patterns to be observed when these events have occurred as patterns for matching. Upon acquiring a vibration pattern included in returning light, the identifying unit 22 compares the acquired vibration pattern against the patterns for matching. If the patterns for matching include a pattern that matches the vibration pattern included in the returning light at a matching rate that is no lower than a threshold, the identifying unit 22 determines that the event corresponding to this pattern for matching has occurred.

Alternatively, the identifying unit 22 may identify an event occurring at the fence F and its surrounding area by use of a learning model that identifies an event through a convolutional neural network (CNN). For example, the identifying unit 22 constructs a learning model in advance by inputting a plurality of sets each including training data indicating an event that occurs at the fence F and its surrounding area and a vibration pattern observed when this event has occurred, and stores this learning model in advance into a storage unit (not illustrated). Upon acquiring a vibration pattern included in returning light, the identifying unit 22 inputs the acquired vibration pattern into the learning model. Thus, the identifying unit 22 obtains an event occurring at the fence F and its surrounding area from the resulting output of the learning model.

For example, the event "a person or the like moves inside a tunnel around the fence F" in the above (8) is an event that should be detected especially when the tunnel is installed across a boundary line, such as a national boundary, since this event indicates a likelihood that this tunnel is being used for smuggling or the like.

However, even if the event in the above (8) can be detected based on a single vibration, this event may not be distinguished from the event "a person or an animal walks around the fence F" in (5). When the tunnel is an unknown tunnel, the existence of the unknown tunnel may not be determined based on only a single vibration. However, the existence of this unknown tunnel can be determined when the vibration continues over a certain period. As a result, the event in the above (8) can be determined to be an anomaly.

Meanwhile, for example, the event "a person digs a tunnel around the fence F" in the above (7) can be detected based on a single vibration, and this event can be determined to be an anomaly within a period shorter than the period needed for the event in the above (8) without being monitored for as long a period as for the event in the above (8).

In this manner, different types of events to be identified need different lengths of periods when these events are determined to be an anomaly.

Accordingly, according to the first example embodiment, for each type of event to be identified, a detection condition is set in advance pertaining to the period corresponding to the type of a given event, and this detection condition is stored in advance in a storage unit (not illustrated).

Upon the identifying unit 22 having identified an event, the acquiring unit 23 acquires the detection condition pertaining to the period corresponding to the type of the event identified by the identifying unit 22, and the determining unit 24 determines that the event identified by the identifying unit 22 is an anomaly if the detection condition acquired by the acquiring unit 23 is satisfied.

For example, the detection condition for the event in the above (8) is, for example but not limited to, that the event in the above (8) has been detected a predetermined number of times or more within the period corresponding to the type of the event in the above (8) or that the event in the above (8) has been detected continuously for a predetermined time or longer within the period corresponding to the type of the event in the above (8). This period is longer for the event in the above (8) than for the event in the above (7).

Now, in the following section, an example of an overall flow of an operation of the optical fiber sensing system according to the first example embodiment will be described with reference to FIG. 3.

Figure 3:
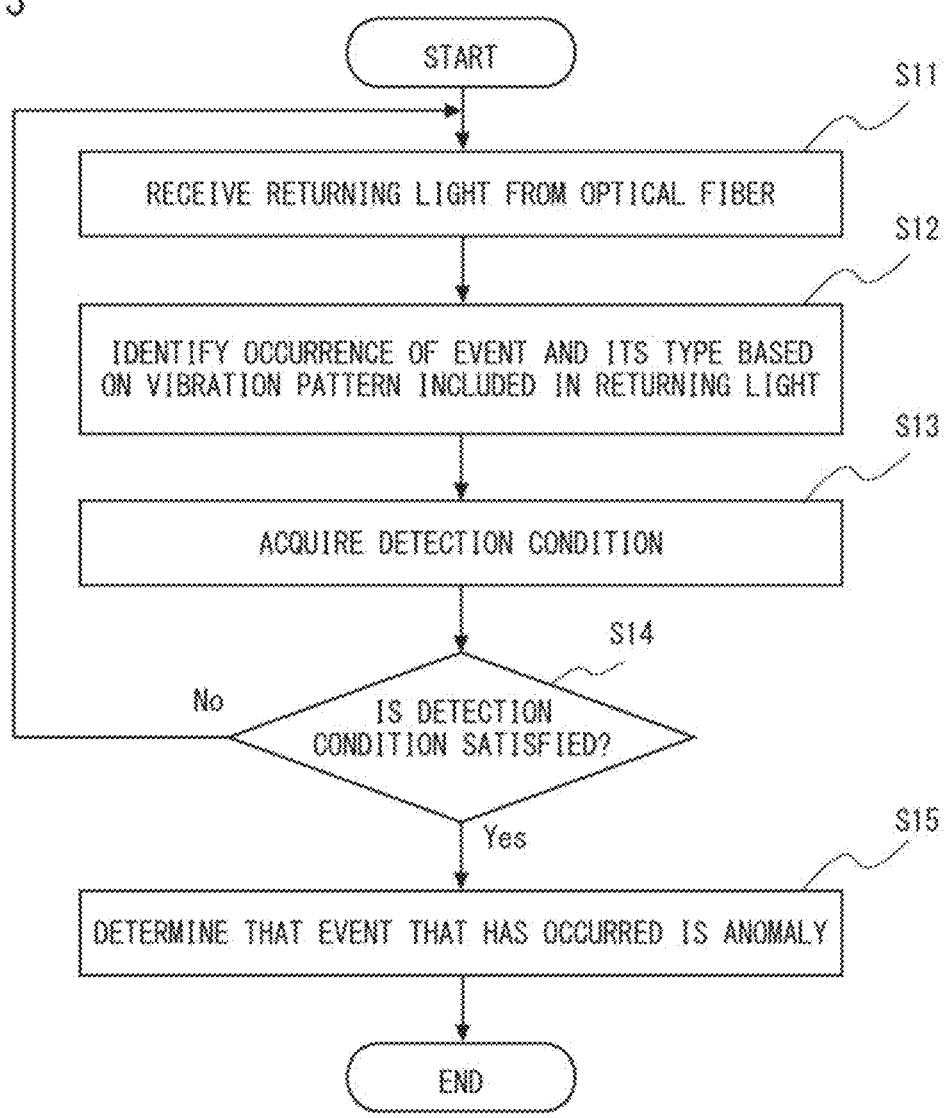
FIG. 3 is a flowchart illustrating an example of an overall flow of an operation of the optical fiber sensing system according to the first example embodiment.

As illustrated in FIG. 3, the receiving unit 21 receives returning light from the optical fiber 10 laid on the fence F (step S11). The identifying unit 22 identifies an occurrence of an event at the fence F and its surrounding area and the type of the event that has occurred based on the vibration pattern included in the returning light that the receiving unit 21 has received (step S12).

Then, the acquiring unit 23 acquires the detection condition pertaining to the period corresponding to the type of the event identified by the identifying unit 22 (step S13). The determining unit 24 determines whether the detection condition acquired by the acquiring unit 23 is satisfied (step S14).

If the detection condition is satisfied at step S14 (Yes at step S14), the determining unit 24 determines that the event identified by the identifying unit 22 is an anomaly (step S15). Meanwhile, if the detection condition is not satisfied (No at step S14), the flow returns to the process at step S11.

As described above, according to the first example embodiment, the identifying unit 22 identifies an occurrence of an event and the type of the event that has occurred based on a vibration pattern included in returning light received from the optical fiber 10. The acquiring unit 23 acquires the detection condition pertaining to the period corresponding to the type of the event identified by the identifying unit 22. The determining unit 24 determines that the event identified by the identifying unit 22 is an anomaly if the detection condition acquired by the acquiring unit 23 is satisfied.

In other words, according to the first example embodiment, even when an event that cannot easily be determined to be an anomaly unless vibrations continue to be detected over a certain period has been identified, whether the identified event is an anomaly is determined based on whether the detection condition pertaining to the period corresponding to the type of the identified event is satisfied. Accordingly, whether an event is an anomaly can be determined even for an event that cannot be determined to be an anomaly unless vibrations continue to be detected over a certain period.

Second Example Embodiment

Now, with reference to FIG. 4, an example of a configuration of an optical fiber sensing system according to a second example embodiment will be described.

Figure 4:
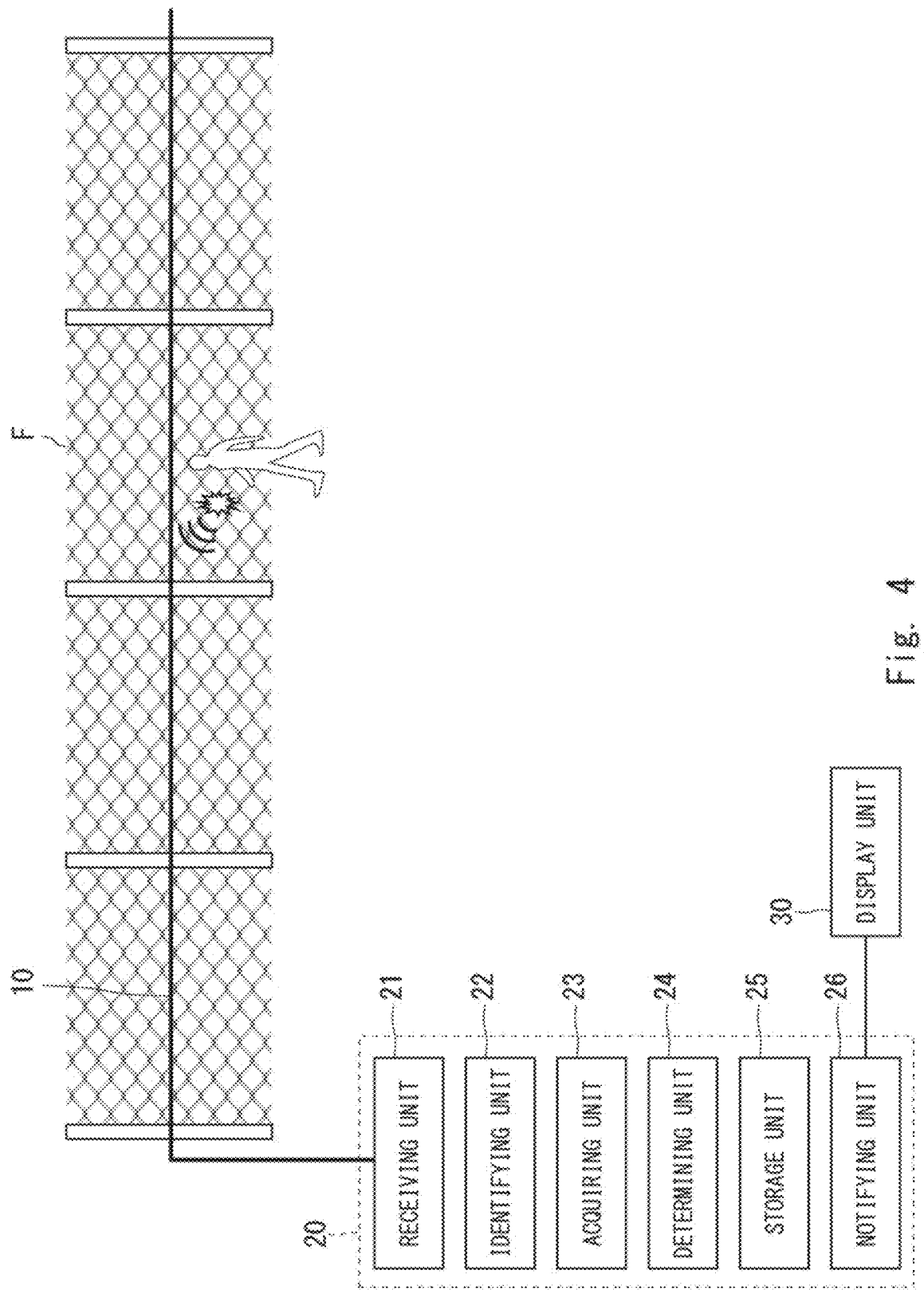
FIG. 4 illustrates an example of a configuration of an optical fiber sensing system according to a second example embodiment.

As illustrated in FIG. 4, the configuration of the optical fiber sensing system according to the second example embodiment differs from the configuration of the counterpart according to the first example embodiment described above in that the optical fiber sensing system additionally includes a display unit 30 and in that the optical fiber sensing device 20 additionally includes a storage unit 25 and a notifying unit 26.

The storage unit 25 stores, as history information, information indicating, for example but not limited to, the time when an event identified by the identifying unit 22 has occurred, the location of occurrence, the type, the identification (ID), the content of the vibration observed when that event has occurred, and whether this event corresponds to an anomaly. It suffices that the history information include at least information indicating the time when an event has occurred, the location of occurrence, the type, the content of the vibration, and whether this event is an anomaly. When the identifying unit 22 has identified identical events occurring temporally and spatially close to each other, the storage unit 25 determines that these events are a continuous event. Thus, the storage unit 25 groups the IDs of these events into a single ID and additionally stores, as history information, information indicating a movement path that is based on the locations of occurrence of these events.

The storage unit 25 also stores the detection condition for each type of event to be identified. In a case where the identifying unit 22 identifies an event by use of pattern matching, the storage unit 25 also stores patterns for matching for the respective types of events to be identified. In a case where the identifying unit 22 identifies an event by use of a learning model, the storage unit 25 also stores the learning model.

The display unit 30 is, for example but not limited to, a display or a monitor installed at a monitoring center or the like where the fence F and its surrounding area are monitored. Alternatively, the display unit 30 may be a display of a mobile terminal of a security guard.

When the determining unit 24 has determined that an event identified by the identifying unit 22 is an anomaly, the notifying unit 26 issues an alert by displaying, on the display unit 30, a graphical user interface (GUI) screen indicating that an anomaly has occurred.

According to the second example embodiment, events to be identified are classified into a plurality of groups in accordance with the period needed to determine that a given event is an anomaly. In this example, events to be identified are classified into three groups: a short-term event, a mid-term event, and a long-term event. The number of the groups for classification is not limited to three, and it suffices that events be classified into two or more groups.

For example, the events in the above (1) to (8) are classified as follows.

Short-Term Events:
  (1) A person grabs and shakes the fence F.
  (2) A person hits the fence F.
  (3) A person climbs the fence F.
  (4) A person ladders the fence F and climbs the ladder.
Mid-Term Events:
  (5) A person or an animal walks around the fence F.
  (6) A vehicle, a motorcycle, or a train runs around the fence F.
  (7) A person digs a tunnel around the fence F.
Long-Term Events:
  (8) A person or the like moves inside a tunnel around the fence F.

According to the first example embodiment described above, upon the identifying unit 22 having identified an event, whether this identified event is an anomaly is determined based on whether the detection condition pertaining to the period corresponding to the type of the identified event is satisfied.

However, short-term events described above can be an extremely malicious event or an event that requires an immediate action, and a short-term event can be regarded as an event that may be immediately determined to be an anomaly regardless of whether the detection condition is satisfied. Therefore, in a case where an event identified by the identifying unit 22 is a short-term event and if the determining unit 24 immediately determines that the identified event is an anomaly, the anomaly determination can be made promptly, and the action to be taken thereafter (e.g., sending a guard) can be initiated promptly.

Accordingly, according to the second example embodiment, in a case where an event identified by the identifying unit 22 is a short-term event, the determining unit 24 determines that the event identified by the identifying unit 22 is an anomaly regardless of the detection condition. This configuration makes it possible to omit the process in which the acquiring unit 23 acquires the detection condition as well as the process in which the determining unit 24 determines whether the detection condition is satisfied.

Meanwhile, in a case where an event identified by the identifying unit 22 is a long-term event or a mid-term event, as with the first example embodiment described above, the acquiring unit 23 acquires a detection condition, and the determining unit 24 determines that the event identified by the identifying unit 22 is an anomaly if the acquired detection condition is satisfied. Herein, a long-term event is one example of one of a first event or a second event, and a mid-term event is one example of the other one of the first event or the second event.

Now, in the following section, a method with which the determining unit 24 determines whether a long-term event or a mid-term event identified by the identifying unit 22 is an anomaly will be described in detail.

A detection condition for a long-term event is, for example but not limited to, that the long-term event has been detected a predetermined number of times or more within the period corresponding to the type of this long-term event or that the long-term event has continuously been detected for a predetermined time or longer within the period corresponding to the type of this long-term event. A detection condition for a mid-term event is similar to the detection condition for a long-term event. However, such a period is shorter for a mid-term event than for a long-term event. The period may be the same or different for each type of long-term event. Similarly, the period may be the same or different for each type of mid-term event.

When the identifying unit 22 has identified a long-term event, the determining unit 24 extracts, from the storage unit 25, history information regarding a long-term event that is identical to the long-term event identified by the identifying unit 22 and that has occurred at the same location as the long-term event identified by the identifying unit 22 or at its surrounding area within the period corresponding to the type of the long-term event identified by the identifying unit 22 as well as history information regarding a long-term event that is identical to the long-term event identified by the identifying unit 22 and that includes the aforementioned location in its movement path within the period corresponding to the type of the long-term event identified by the identifying unit 22. Then, the determining unit 24 determines whether the detection condition is satisfied based on the history information extracted from the storage unit 25. If the result of the determination indicates that the detection condition is satisfied, the determining unit 24 determines that the long-term event identified by the identifying unit 22 is an anomaly.

For example, the detection condition for a long-term event identified by the identifying unit 22 may be that the long-term event is detected a predetermined number of times or more within the period corresponding to the type of this long-term event. In this case, the determining unit 24 counts the number of occurrences of a long-term event that is identical to the long-term event identified by the identifying unit 22 and that has occurred at the same location as the long-term event identified by the identifying unit 22 or at its surrounding area within the period corresponding to the type of the long-term event identified by the identifying unit 22 as well as the number of occurrences of a long-term event that is identical to the long-term event identified by the identifying unit 22 and that includes the aforementioned location in its movement path within the period corresponding to the type of the long-term event identified by the identifying unit 22. Then, the determining unit 24 determines that the detection condition is satisfied if the counted number of occurrences is no lower than a predetermined number.

The detection condition for a long-term event is not limited to the example described above. For example, the detection condition for a long-term event may be a condition where the vibration intensity of a vibration observed in the period corresponding to the type of the long-term event is used. To be more specific, the vibration intensity may be derived based on the content of the vibration observed when a long-term event has occurred within the period corresponding to the type of the long-term event, and the detection condition for the long-term event may be, for example but not limited to, that the number of times the vibration intensity has reached or exceeded a threshold is no lower than a predetermined number or that the time for which the vibration intensity has reached or exceeded a threshold is no shorter than a predetermined time.

The period corresponding to the type of a long-term event tends to be long for a long-term event, and thus the amount of information of history information to be extracted from the storage unit 25 tends to be large. Therefore, the determining unit 24 may compress the history information extracted from the storage unit 25 and determine whether the detection condition is satisfied based on the compressed history information. For example, in a case where the period corresponding to the type of a long-term event is one month, the determining unit 24 may compress the history information by converting the vibration intensity observed over the period of one month into the mean value, the maximum value, the minimum value, the median value, the deviation, or the like per unit time (e.g., one minute). Then, the detection condition for the long-term event may be, for example but not limited to, that the number of times the vibration intensity obtained by compressing the history information has reached or exceeded a threshold is no lower than a predetermined number or that the time for which the vibration intensity has reached or exceeded a threshold is no shorter than a predetermined time.

Herein, the method of determining whether a mid-term event is an anomaly is similar to the method of determining whether a long-term event is an anomaly. In addition, other examples of the detection condition for a mid-term event are similar to the other examples of the detection condition for a long-term event.

The detection conditions for a mid-term event and a long-term event may be set individually for each event. For example, in the case of the event "a person digs a tunnel around the fence F" in the above (7), if this tunnel runs across a boundary, such as a national boundary, this person digs the tunnel from a location away from the boundary and proceeds toward the boundary. Therefore, it is conceivable that the vibration intensity increases gradually in the vicinity of the boundary. Accordingly, for the event in the above (7), the detection condition may be that the vibration intensity increases gradually within the period corresponding to the event in the above (7).

Now, in the following section, an example of a GUI screen that the notifying unit 26 displays on the display unit 30 when the determining unit 24 has determined that an event identified by the identifying unit 22 is an anomaly will be described. As illustrated in FIG. 5, the storage unit 25 holds a correspondence table indicating a correspondence relationship between the location on the optical fiber 10 (the distance from the optical fiber sensing device 20) and a region (Region) corresponding to that location, and the identifying unit 22 identifies the location of occurrence of the event as a region of occurrence by use of the correspondence table. As will be described later, in a case where a monitoring area is monitored with a camera as well, the aforementioned region may be set in accordance with the imaging range of the camera. In other words, the aforementioned region may be set for each imaging range of the camera.

Figure 6:
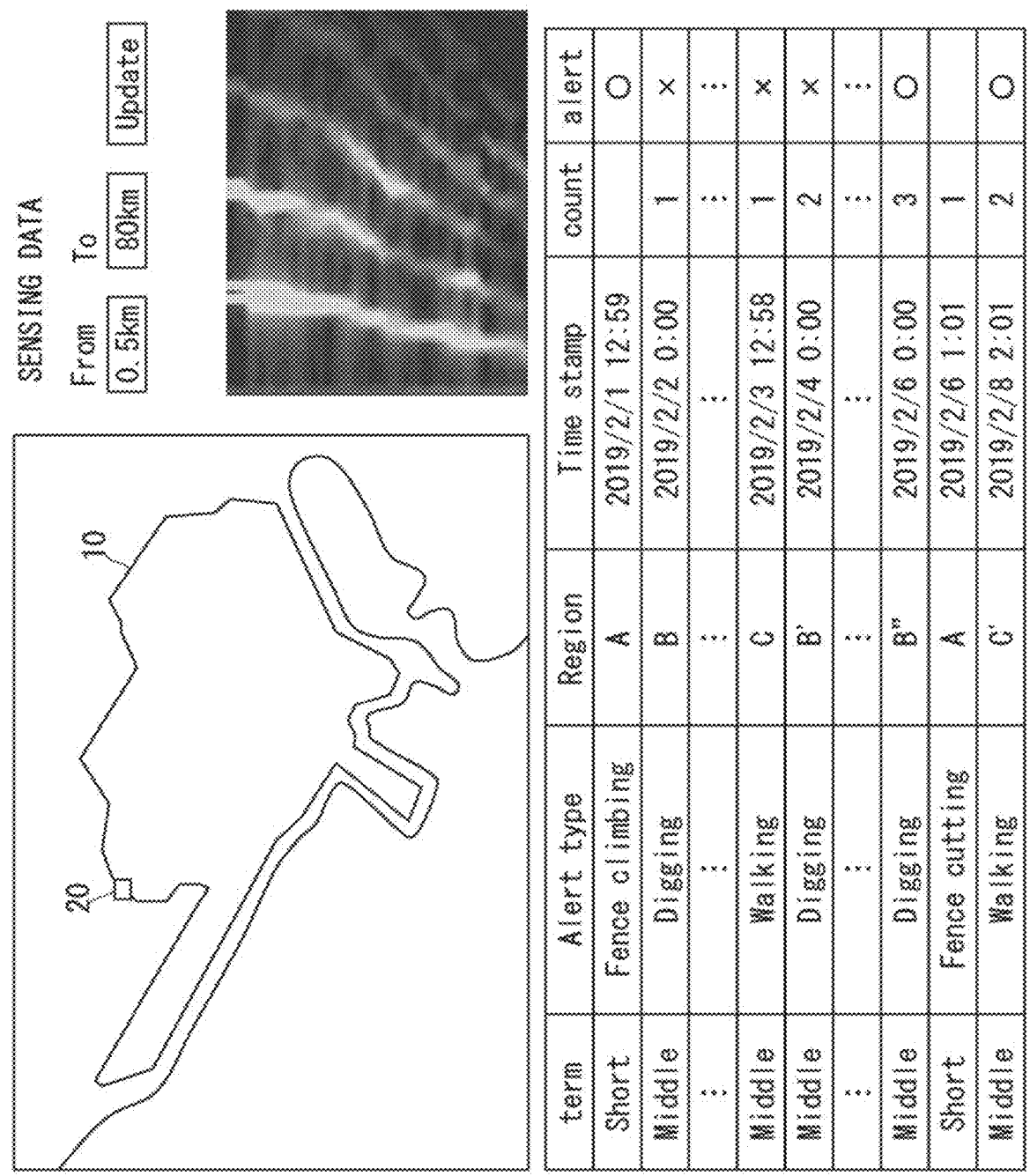
FIG. 6 illustrates an example of a GUI screen that a notifying unit displays on a display unit according to the second example embodiment.

In the example illustrated in FIG. 6, the notifying unit 26 superposes the location where the optical fiber 10 is laid and the location where the optical fiber sensing device 20 is installed on a map of a monitoring area and displays the resulting map on the display unit 30.

Moreover, the notifying unit 26 displays sensing data indicating vibration patterns included in the returning light on the display unit 30. This sensing data is similar to the one illustrated in FIG. 2 and is generated by the identifying unit 22. In the example illustrated in FIG. 6, the user can specify the range of the sensing data. In the example illustrated in FIG. 6, the user has specified the sensing data within the range where the distance from the optical fiber sensing device 20 is from 0.5 km to 80 km, and the notifying unit 26 acquires the sensing data specified by the user from the identifying unit 22 and displays the acquired sensing data on the display unit 30.

The notifying unit 26 also displays a list of events identified by the identifying unit 22 on the display unit 30. In the example illustrated in FIG. 6, the notifying unit 26 displays, as the items for each event, the group into which the event is classified (term), the type of the event (Alert type), the region of occurrence of the event (Region), the time when the event has occurred (Time stamp), the number of occurrences of the event (count), and whether the event corresponds to an anomaly (alert). The items to be displayed on the display unit 30, however, are not limited to these examples. It suffices that the items to be displayed on the display unit 30 include at least information indicating the time when the event has occurred, the location of occurrence, the type, and whether the event is an anomaly.

Figure 7:
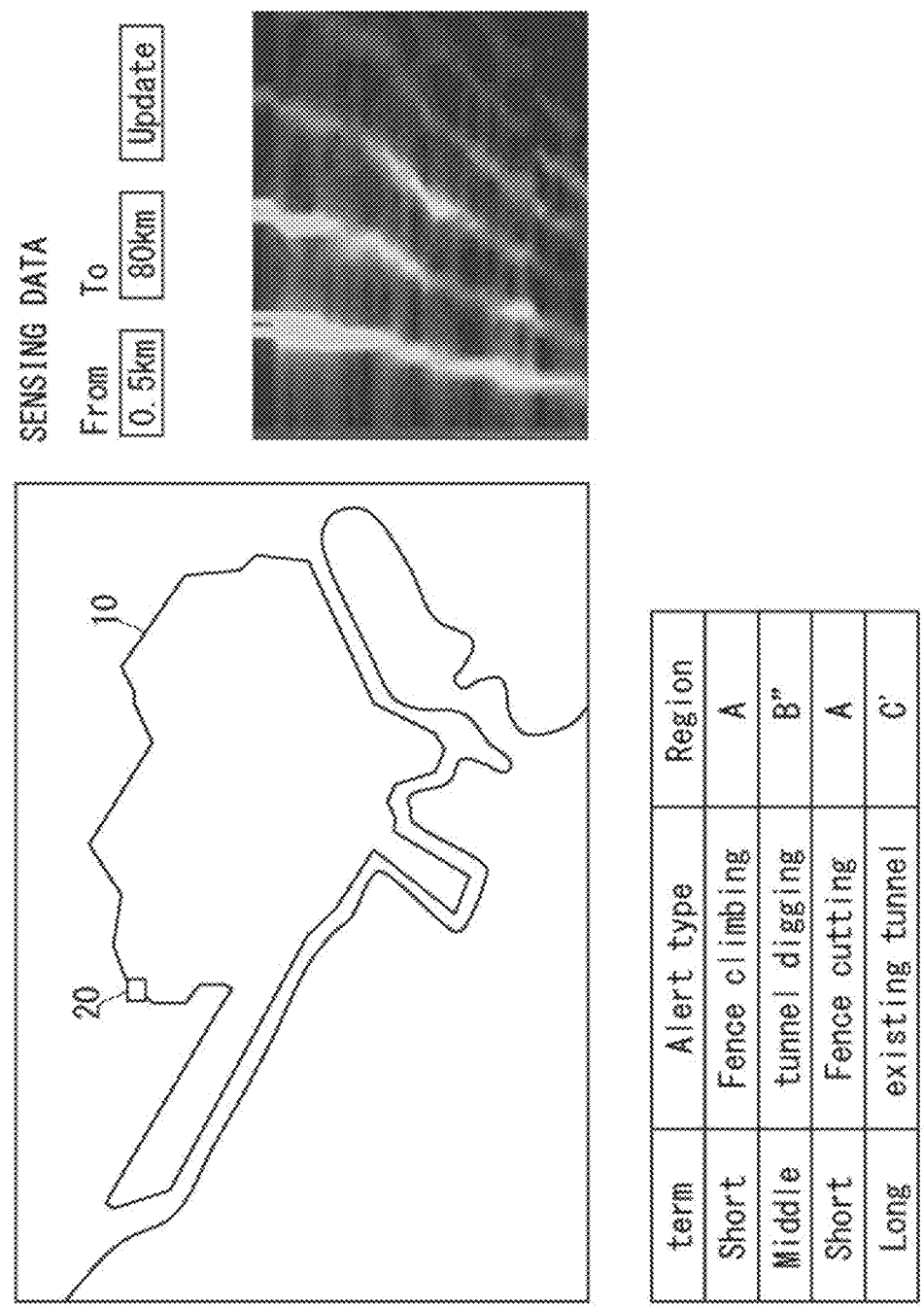
FIG. 7 illustrates another example of a GUI screen that the notifying unit displays on the display unit according to the second example embodiment.

In the example illustrated in FIG. 7, the notifying unit 26 lumps together a part of the list of events displayed in FIG. 6 and displays the resulting list on the display unit 30. Specifically, in the example illustrated in FIG. 7, the notifying unit 26 lumps together the events that are of the same type and that have occurred in the same region and displays the resulting list on the display unit 30. How events are lumped together is a design matter, and the above is not a limiting example. In the example illustrated in FIG. 7, the notifying unit 26 displays, as the items for each event, the group into which the event is classified (term), the type of the event (Alert type), and the region of occurrence of the event (Region).

Figure 8:
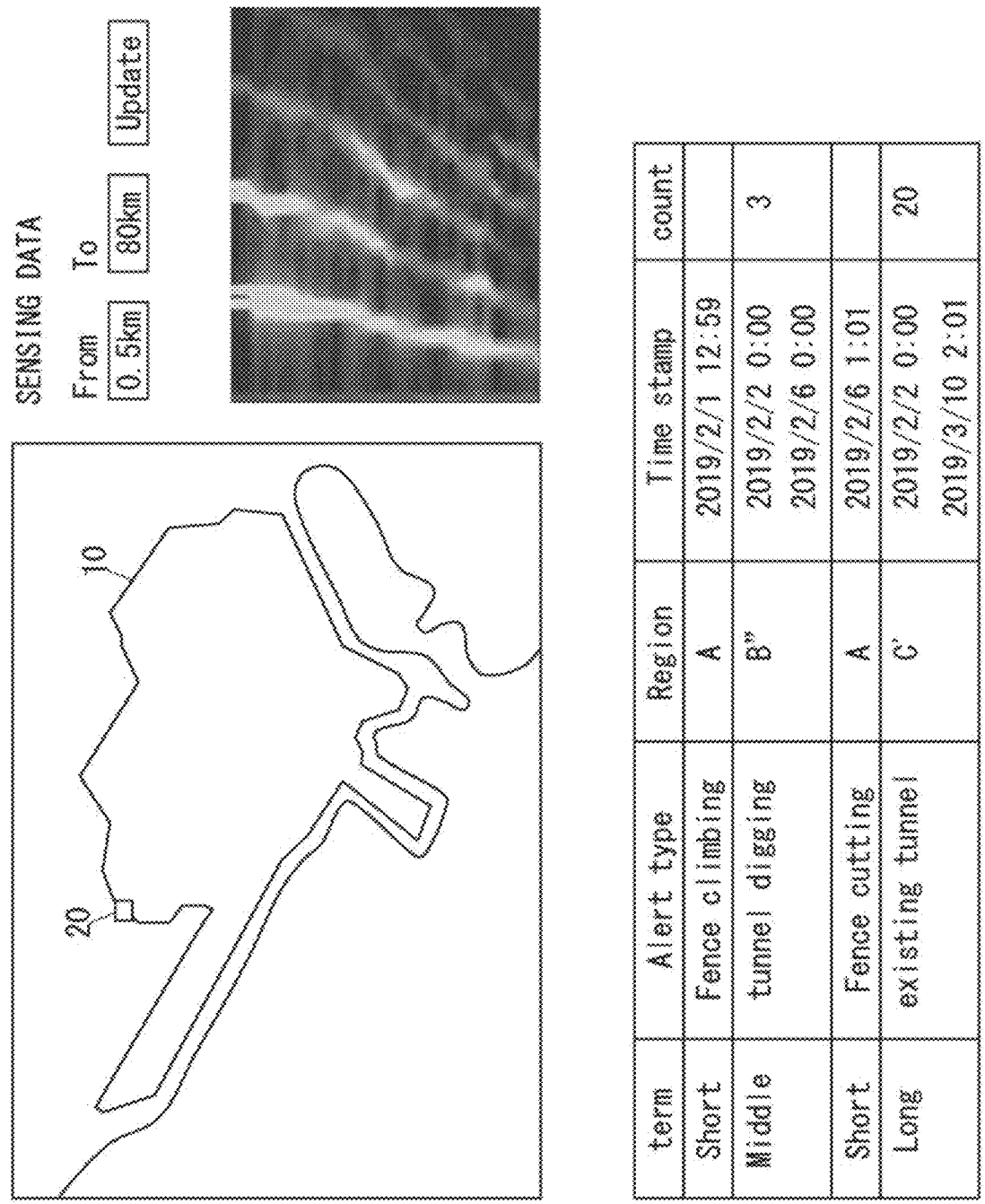
FIG. 8 illustrates yet another example of a GUI screen that the notifying unit displays on the display unit according to the second example embodiment.

In the example illustrated in FIG. 8, the notifying unit 26 has added items to the list of events displayed in FIG. 7. Specifically, in the example illustrated in FIG. 8, the notifying unit 26 has added the period in which the event has occurred (Time stamp) and the number of occurrences of the event (count). The items to be additionally displayed on the display unit 30, however, are not limited to these examples.

Figure 9:
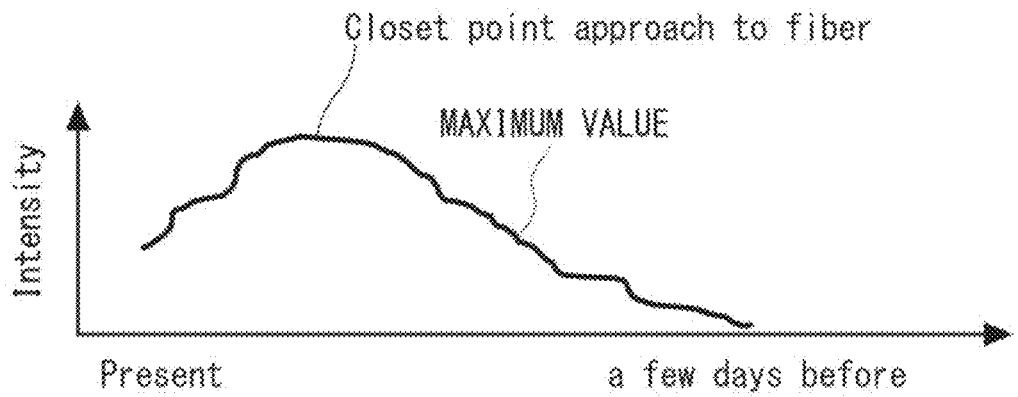
FIG. 9 illustrates yet another example of a GUI screen that the notifying unit displays on the display unit according to the second example embodiment.

FIG. 9 is an example of a GUI screen on another page to be displayed in response to a click on tunnel digging in the detection result on the GUI screen illustrated in FIG. 7 or FIG. 8.

In the example illustrated in FIG. 9, the notifying unit 26 displays, on the display unit 30, a graph indicating a change in the maximum value of the vibration intensity observed when the event "a person digs a tunnel around the fence F" in the above (7) has occurred. In the case of the event in the above (7), if this tunnel runs across a boundary, such as a national boundary, this person digs the tunnel from a location away from the boundary and proceeds toward the boundary. After crossing the boundary, this person digs the tunnel while moving away from the boundary. In the example illustrated in FIG. 9, this phenomenon is presented in the form of vibration intensity. The vibration intensity increases gradually, and upon reaching the peak, the vibration intensity decreases gradually. As described above, the identifying unit 22 can identify the direction in which the event has occurred, and thus combining the direction in which the event has occurred as identified by the identifying unit 22 makes it possible to identify from which side of the boundary the tunnel is being dug. In the example illustrated in FIG. 9, the position where the vibration intensity peaks is considered to be the position where the person digging the tunnel has come closest to the optical fiber 10. The example illustrated in FIG. 9 displays a graph indicating a change in the maximum value of the vibration intensity, but this is not a limiting example. It suffices that the notifying unit 26 display a graph indicating a change in one of the maximum value, the minimum value, the mean value, or the median value of the vibration intensity.

Figure 10:
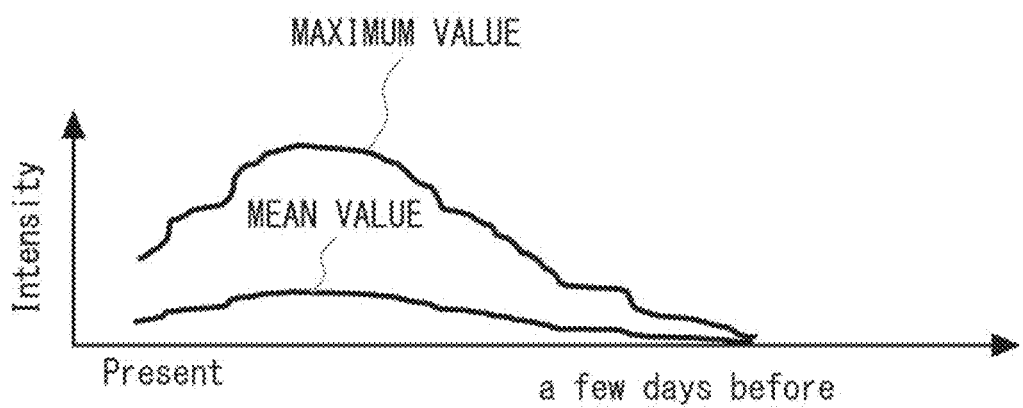
FIG. 10 illustrates yet another example of a GUI screen that the notifying unit displays on the display unit according to the second example embodiment.

In the example illustrated in FIG. 10, the notifying unit 26 displays, on the display unit 30, a graph indicating a change in the mean value of the vibration intensity as well as a change in the maximum value of the vibration intensity displayed in FIG. 9. This, however, is not a limiting example. It suffices that the notifying unit 26 display a graph indicating a change in two or more selected from the maximum value, the minimum value, the mean value, and the median value of the vibration intensity.

For example, in the case of an event where there is an electric generator, continuous vibrations are highly likely to occur constantly, and thus the state of the electric generator can be grasped by checking the mean value of the vibration intensity. Meanwhile, in the case of an event where a tunnel is dug, the vibration intensity is expected to increase gradually, and the progress of the tunnel digging can be checked by checking a change in the maximum value of the vibration intensity. In this manner, since the value where the feature of an event is manifested differs on the time axis depending on the event, it is more effective if a graph indicating two or more changes is displayed.

Figure 11:
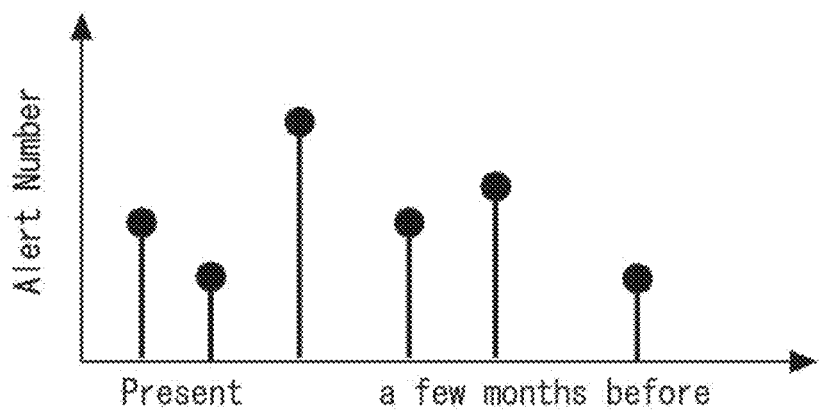
FIG. 11 illustrates yet another example of a GUI screen that the notifying unit displays on the display unit according to the second example embodiment.

FIG. 11 is an example of a GUI screen on another page to be displayed in response to a click on existing tunnel in the detection result on the GUI screen illustrated in FIG. 7 or FIG. 8.

In the example illustrated in FIG. 11, the notifying unit 26 displays, on the display unit 30, a graph indicating the number of occurrences per month of the event "a person or the like moves inside a tunnel around the fence F" in the above (8). In the example illustrated in FIG. 10, the unit period is one month, but this is not a limiting example. For example, the unit period may be one week, one day, or the like.

Figure 12:
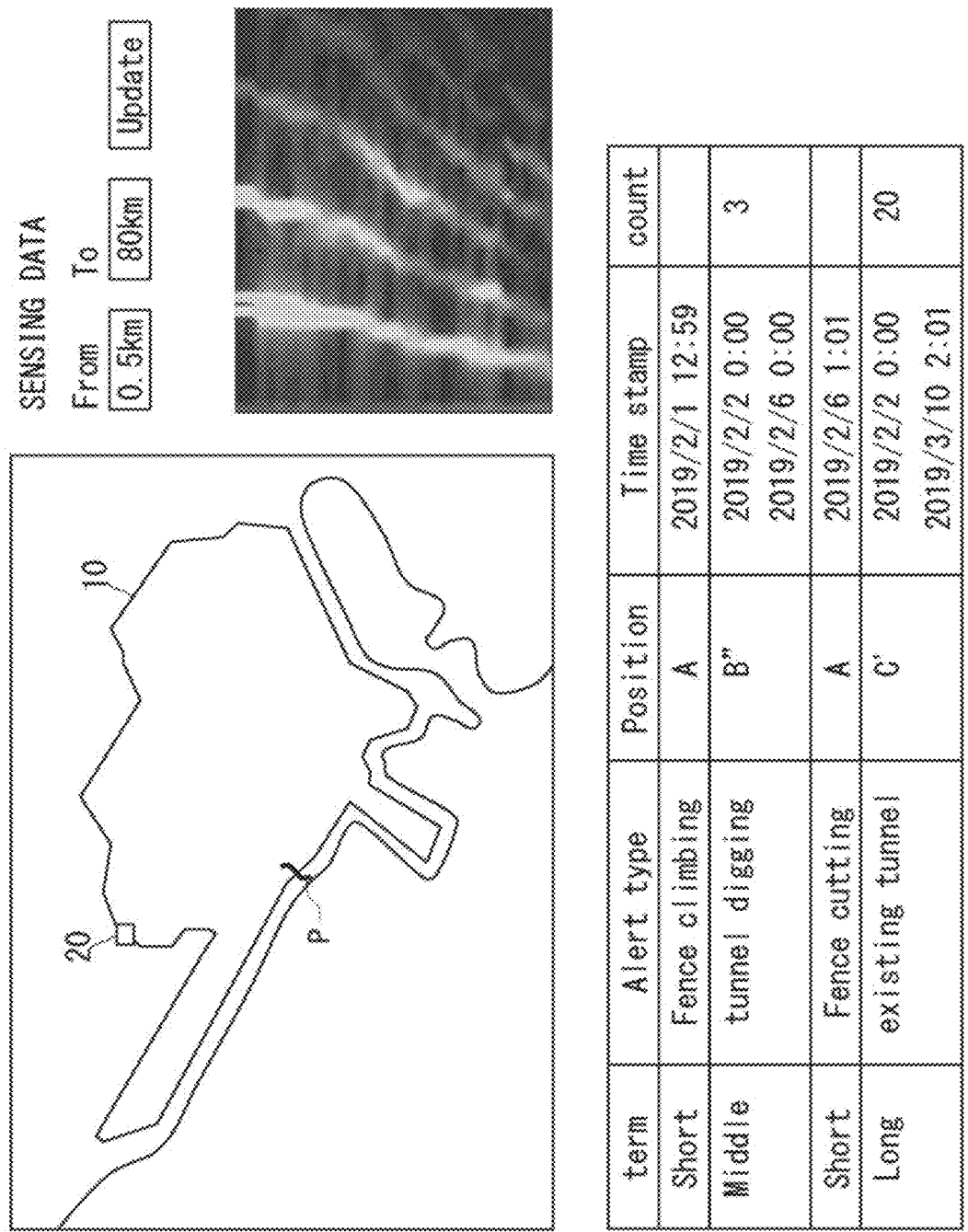
FIG. 12 illustrates yet another example of a GUI screen that the notifying unit displays on the display unit according to the second example embodiment.

FIG. 12 is an example of a GUI screen displayed upon a transition from the GUI screen illustrated in FIG. 8 in response to a click on tunnel digging in the detection result.

In the example illustrated in FIG. 12, the notifying unit 26 superposes history P of the location of occurrence on a map of a monitoring area based on a change in the location of occurrence observed when the event "a person digs a tunnel around the fence F" in the above (7) has occurred and displays the resulting map on the display unit 30.

FIG. 9 to FIG. 12 are each an example of a GUI screen displayed when the event "a person digs a tunnel around the fence F" in the above (7) or the event "a person or the like moves inside a tunnel around the fence F" in (8) has occurred. However, these examples are not limited to the event in the above (7) or (8) and can also be applied in a case where the same event is identified over a predetermined period, that is, in a case where a mid-term event or a long-term event has been identified.

Now, in the following section, an example of an overall flow of an operation of the optical fiber sensing system according to the second example embodiment will be described with reference to FIG. 13.

Figure 13:
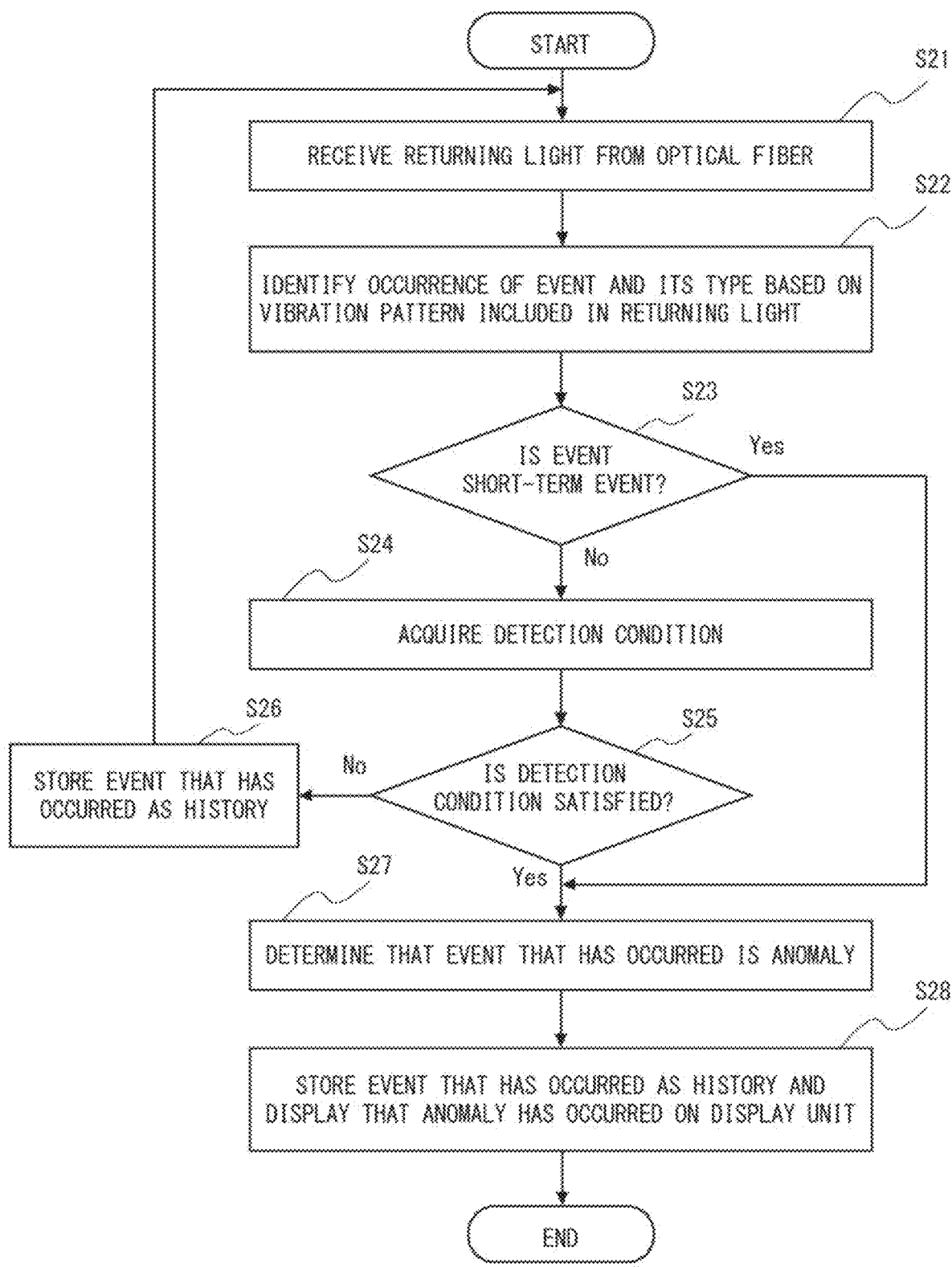
FIG. 13 is a flowchart illustrating an example of an overall flow of an operation of the optical fiber sensing system according to the second example embodiment.

As illustrated in FIG. 13, the receiving unit 21 receives returning light from the optical fiber 10 laid on the fence F (step S21). The identifying unit 22 identifies an occurrence of an event at the fence F and its surrounding area and the type of the event that has occurred based on a vibration pattern included in the returning light that the receiving unit 21 has received (step S22). At this point, the identifying unit 22 identifies the location of occurrence where this event has occurred as well.

Next, the acquiring unit 23 and the determining unit 24 determine whether the event identified by the identifying unit 22 is a short-term event (step S23).

If the event identified by the identifying unit 22 is not a short-term event at step S23 (No at step S23), the acquiring unit 23 acquires a detection condition pertaining to the period corresponding to the type of the event identified by the identifying unit 22 (step S24). The determining unit 24 determines whether the detection condition acquired by the acquiring unit 23 is satisfied (step S25).

If the detection condition is satisfied at step S25 (Yes at step S25), the determining unit 24 determines that the event identified by the identifying unit 22 is an anomaly (step S27). Next, the storage unit 25 stores, as history information, information indicating, for example, the time when the event identified by the identifying unit 22 has occurred, the location of occurrence, the type, the ID, the content of the vibration, and whether the event is an anomaly (the event is an anomaly in this example), and the notifying unit 26 displays, on the display unit 30, a GUI screen illustrated, for example, in FIG. 6 to FIG. 12 indicating that an anomaly has occurred (step S28).

If the detection condition is not satisfied at step S25 (No at step S25), the storage unit 25 stores, as history information, information indicating, for example, the time when the event identified by the identifying unit 22 has occurred, the location of occurrence, the type, and the ID, the content of the vibration, and whether the event is an anomaly (the event is not an anomaly in this example) (step S26), and the flow returns to the process at step S21.

Meanwhile, if the event identified by the identifying unit 22 is a short-term event at step S23 (Yes at step S23), the determining unit 24 determines that the event identified by the identifying unit 22 is an anomaly regardless of the detection condition (step S27), and then the process at step S28 described above is performed.

As described above, according to the second example embodiment, the storage unit 25 stores, as history information, information indicating, for example, the time when an event identified by the identifying unit 22 has occurred, the location of occurrence, the type, the content of the vibration, and whether the event is an anomaly. If the event identified by the identifying unit 22 is a mid-term event or a long-term event, the determining unit 24 extracts, from the storage unit 25, the history information regarding the event identified by the identifying unit 22 and determines whether the detection condition is satisfied based on the extracted history information. If the detection condition is satisfied, the determining unit 24 determines that the event identified by the identifying unit 22 is an anomaly.

In other words, according to the second example embodiment, information regarding an event identified by the identifying unit 22 is stored as history information, and whether the detection condition is satisfied is determined based on the history information regarding the event identified by the identifying unit 22. Accordingly, whether the detection condition is satisfied can be determined with ease. Other advantageous effects are similar to those described above according to the first example embodiment.

Other Example Embodiments

According to the example embodiments described above, a monitoring area includes the fence F and its surrounding area, but this is not a limiting example. For example, with a monitoring area being an area where a pipeline is disposed, deterioration or the like of the pipeline may be detected as a long-term event, and a breakage, a rupture, or the like of the pipeline may be detected as a short-term event. Alternatively, with a monitoring area being an area along a road or a railroad, deterioration of the road or the railroad may be detected as a long-term event, and a rock falling to the road or the railroad, for example, may be detected as a short-term event.

In the example described above according to the foregoing example embodiments, a monitoring area is monitored by a single optical fiber sensing device 20, but this is not a limiting example. A monitoring area may be divided into a plurality of regions. A plurality of optical fiber sensing devices 20 may be provided for the respective regions, and the plurality of optical fiber sensing devices 20 may monitor the respective regions. In this case, the list of events on the GUI screen illustrated in FIG. 6 and so on may display, for example, the ID of the optical fiber sensing device 20 that has identified each event.

In the example described above according to the foregoing example embodiments, a monitoring area is monitored by the optical fiber sensing device 20, but this is not a limiting example. One or more cameras may be provided in a monitoring area, and the monitoring area may be monitored by the optical fiber sensing device 20 and the cameras with an image of an event identified by the identifying unit 22 being captured by any one of the cameras. In this case, the list of events on the GUI screen illustrated in FIG. 6 and so on may display, for example, the ID of the camera that has captured the image of the event.

According to the foregoing example embodiments, the optical fiber sensing device 20 includes a plurality of constituent elements (the receiving unit 21, the identifying unit 22, the acquiring unit 23, the determining unit 24, the storage unit 25, and the notifying unit 26), but this is not a limiting example. It is not limited that the constituent elements of the optical fiber sensing device 20 are provided in a single device, and these constituent elements may be distributed over a plurality of devices.

Hardware Configuration of Optical Fiber Sensing Device

Now, with reference to FIG. 14, a hardware configuration of a computer 40 that implements the optical fiber sensing device 20 will be described below.

Figure 14:
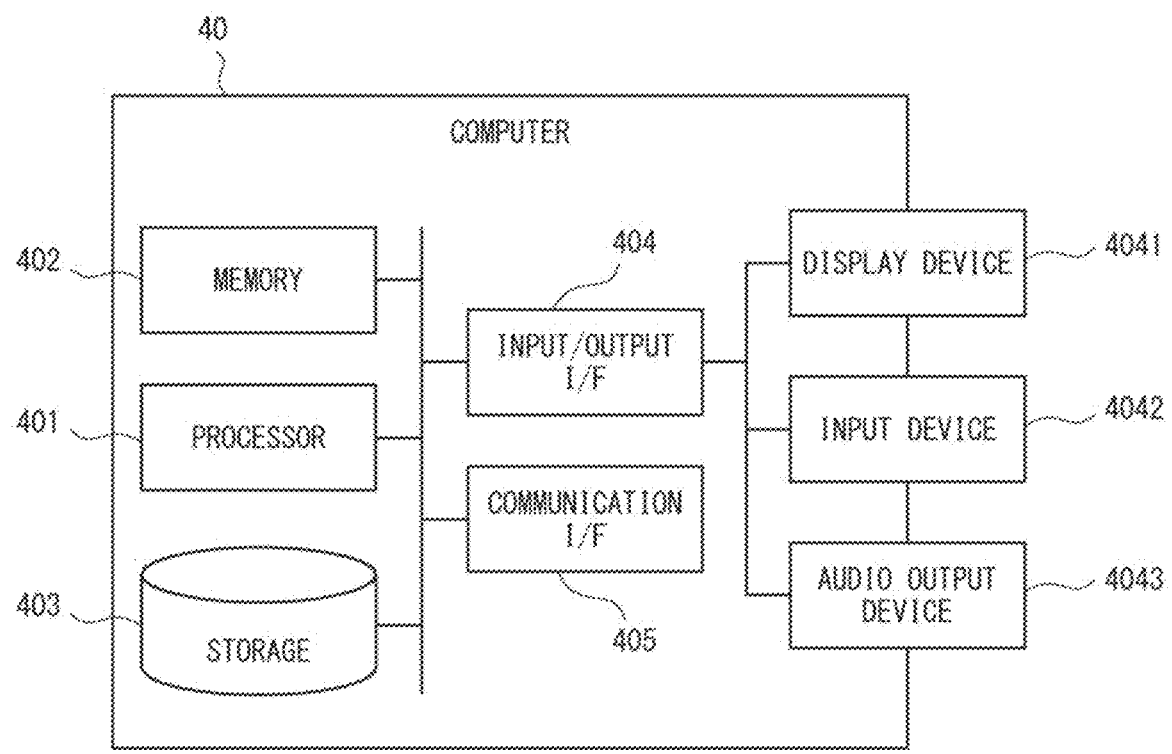
FIG. 14 is a block diagram illustrating an example of a hardware configuration of a computer that implements an optical fiber sensing device.

As illustrated in FIG. 14, the computer 40 includes a processor 401, a memory 402, a storage 403, an input/output interface (input/output I/F) 404, and a communication interface (communication I/F) 405, for example. The processor 401, the memory 402, the storage 403, the input/output interface 404, and the communication interface 405 are connected to each other by a data transmission line for transmitting and receiving data therebetween.

The processor 401 is an arithmetic operation processing device, such as a central processing unit (CPU) or a graphics processing unit (GPU), for example. The memory 402 is a memory, such as a random-access memory (RAM) or a read-only memory (ROM), for example. The storage 403 is a storage device, such as a hard-disk drive (HDD), a solid-state drive (SSD), or a memory card, for example. The storage 403 may also be a memory, such as a RAM or a ROM.

The storage 403 stores programs that implement the functions of the respective constituent elements (the receiving unit 21, the identifying unit 22, the acquiring unit 23, the determining unit 24, the storage unit 25, and the notifying unit 26) included in the optical fiber sensing device 20. The processor 401 executes these programs to implement the functions of the respective constituent elements included in the optical fiber sensing device 20. When the processor 401 executes these programs, the processor 401 may execute the programs upon loading them onto the memory 402 or execute the programs without loading them onto the memory 402. The memory 402 or the storage 403 fills the role of the storage unit 25 and also fills the role of storing information or data held by other constituent elements included in the optical fiber sensing device 20.

These programs can be stored by use of various types of non-transitory computer-readable media and supplied to a computer (including the computer 40). The non-transitory computer-readable media include various types of tangible storage media. Examples of such non-transitory computer-readable media include a magnetic storage medium (e.g., a flexible disk, a magnetic tape, a hard-disk drive), a magneto-optical recording medium (e.g., a magneto-optical disk), a compact disc-ROM (CD-ROM), a CD-recordable (CD-R), a CD-rewritable (CD-R/W), and a semiconductor memory (e.g., a mask ROM, a programmable ROM (PROM), an erasable PROM (EPROM), a flash ROM, a RAM). The programs may also be supplied to a computer via various types of transitory computer-readable media. Examples of such transitory computer-readable media include an electric signal, an optical signal, and an electromagnetic wave. A transitory computer-readable medium can supply the programs to a computer via a wired communication line, such as an electric wire or an optical fiber, or via a wireless communication line.

The input/output interface 404 is connected to, for example, a display device 4041, an input device 4042, and an audio output device 4043. The display device 4041 is a device, such as a liquid-crystal display (LCD), a cathode-ray tube (CRT) display, or a monitor, that displays a screen corresponding to rendering data processed by the processor 401. The input device 4042 is a device that receives input of an operator's operation. The input device 4042 is, for example but not limited to, a keyboard, a mouse, or a touch sensor. The display device 4041 and the input device 4042 may be integrated and implemented in the form of a touch panel. The audio output device 4043 is a device, such as a loudspeaker, that audibly outputs a sound corresponding to audio data processed by the processor 401.

The communication interface 405 transmits and receives data to and from an external device. For example, the communication interface 405 communicates with an external device via a wired communication line or a wireless communication line.

Thus far, the present disclosure has been described by reference to some example embodiments, but the present disclosure is not limited by the example embodiments described above. Various modifications that a person skilled in the art can appreciate can be made to the configurations and the details of the present disclosure within the scope of the present disclosure.

For example, a part or the whole of each example embodiment described above may be combined with each other.

A part or the whole of the foregoing example embodiments can also be expressed as in the following supplementary notes, which are not limiting.

Supplementary Note 1

An optical fiber sensing system comprising:
a receiving unit configured to receive an optical signal from an optical fiber for sensing;
an identifying unit configured to identify an occurrence of an event and a type of the event that has occurred based on a vibration pattern included in the optical signal;
an acquiring unit configured to acquire a detection condition pertaining to a period corresponding to the type of the event identified by the identifying unit; and
a determining unit configured to determine that the event identified by the identifying unit is an anomaly if the detection condition is satisfied.

Supplementary Note 2

The optical fiber sensing system according to Supplementary Note 1, further comprising a storage unit configured to store, as history information, information including at least the type of the event identified by the identifying unit, a time of occurrence of the event, a location of the occurrence of the event, content of a vibration when the event occurred, and whether the event is an anomaly,
wherein in a case where the identifying unit has identified an event, the determining unit extracts, from the storage unit, history information regarding the event identified by the identifying unit and determines whether the detection condition is satisfied based on the extracted history information.

Supplementary Note 3

The optical fiber sensing system according to Supplementary Note 2, wherein the determining unit compresses the history information extracted from the storage unit and determines whether the detection condition is satisfied based on the compressed history information.

Supplementary Note 4

The optical fiber sensing system according to Supplementary Note 2 or 3, wherein
the event includes at least a first event and a second event,
the detection condition for the first event is a detection condition pertaining to a first period, and
the detection condition for the second event is a detection condition pertaining to a second period different from the first period.

Supplementary Note 5

The optical fiber sensing system according to any one of Supplementary Notes 2 to 4, further comprising:
a display unit; and
a notifying unit configured to provide a display, on the display unit, indicating that an anomaly has occurred if the determining unit has determined that the event identified by the identifying unit is an anomaly.

Supplementary Note 6

The optical fiber sensing system according to Supplementary Note 5, wherein the notifying unit displays, on the display unit, the type of the event identified by the identifying unit, the time of occurrence, the location of occurrence, and whether the event is an anomaly.

Supplementary Note 7

The optical fiber sensing system according to Supplementary Note 5, wherein in a case where the identifying unit has identified the same event over a predetermined period, the notifying unit displays, on the display unit, a graph indicating a change in at least one of a maximum value, a minimum value, a mean value, or a median value of a vibration intensity observed when the event identified by the identifying unit has occurred.

Supplementary Note 8

The optical fiber sensing system according to Supplementary Note 5, wherein in a case where the identifying unit has identified the same event over a predetermined period, the notifying unit displays, on the display unit, a graph indicating a change in two or more selected from a maximum value, a minimum value, a mean value, and a median value of a vibration intensity observed when the event identified by the identifying unit has occurred.

Supplementary Note 9

The optical fiber sensing system according to Supplementary Note 5, wherein in a case where the identifying unit has identified the same event over a predetermined period, the notifying unit displays, on the display unit, a graph indicating the number of occurrences per unit period of the event identified by the identifying unit.

Supplementary Note 10

The optical fiber sensing system according to Supplementary Note 5, wherein in a case where the identifying unit has identified the same event over a predetermined period, the notifying unit superposes a history of a location of occurrence of the event identified by the identifying unit onto a map and displays the map on the display unit.

Supplementary Note 11

A monitoring method of monitoring with an optical fiber sensing system, the monitoring method comprising:
 a receiving step of receiving an optical signal from an optical fiber for sensing;
 an identifying step of identifying an occurrence of an event and a type of the event that has occurred based on a vibration pattern included in the optical signal;
 an acquiring step of acquiring a detection condition pertaining to a period corresponding to the type of the event identified in the identifying step; and
 a determining step of determining that the event identified in the identifying step is an anomaly if the detection condition is satisfied.

Supplementary Note 12

The monitoring method according to Supplementary Note 11, further comprising a storing step of storing, as history information, information including at least the type of the event identified in the identifying step, a time of occurrence of the event, a location of occurrence of the event, content of a vibration when the event occurred, and whether the event is an anomaly into a storage unit,
 wherein in a case where an event has been identified in the identifying step, the determining step includes extracting, from the storage unit, history information regarding the event identified in the identifying step and determining whether the detection condition is satisfied based on the extracted history information.

Supplementary Note 13

The monitoring method according to Supplementary Note 12, wherein the determining step includes compressing the history information extracted from the storage unit and determining whether the detection condition is satisfied based on the compressed history information.

Supplementary Note 14

The monitoring method according to Supplementary Note 12 or 13, wherein the event includes at least a first event and a second event,
the detection condition for the first event is a detection condition pertaining to a first period, and
the detection condition for the second event is a detection condition pertaining to a second period different from the first period.

Supplementary Note 15

The monitoring method according to any one of Supplementary Notes 12 to 14, further comprising a notifying step of providing a display, on a display unit, indicating that an anomaly has occurred if the event identified in the identifying step has been determined to be an anomaly in the determining step.

Supplementary Note 16

The monitoring method according to Supplementary Note 15, wherein the notifying step includes displaying, on the display unit, the type of the event identified in the identifying step, the time of occurrence, the location of occurrence, and whether the event is an anomaly.

Supplementary Note 17

The monitoring method according to Supplementary Note 15, wherein in a case where the same event has been identified over a predetermined period in the identifying step, the notifying step includes displaying, on the display unit, a graph indicating a change in at least one of a maximum value, a minimum value, a mean value, or a median value of a vibration intensity observed when the event identified in the identifying step has occurred.

Supplementary Note 18

The monitoring method according to Supplementary Note 15, wherein in a case where the same event has been identified over a predetermined period in the identifying step, the notifying step includes displaying, on the display unit, a graph indicating a change in two or more selected from a maximum value, a minimum value, a mean value, and a median value of a vibration intensity observed when the event identified in the identifying step has occurred.

Supplementary Note 19

The monitoring method according to Supplementary Note 15, wherein in a case where the same event has been identified over a predetermined period in the identifying step, the notifying step includes displaying, on the display unit, a graph indicating the number of occurrences per unit period of the event identified in the identifying step.

Supplementary Note 20

The monitoring method according to Supplementary Note 15, wherein in a case where the same event has been identified over a predetermined period in the identifying step, the notifying step includes superposing a history of a location of occurrence of the event identified in the identifying step onto a map and displaying the map on the display unit.

Supplementary Note 21

A non-transitory computer-readable medium storing a program that causes a computer to execute:

a receiving procedure of receiving an optical signal from an optical fiber for sensing;

an identifying procedure of identifying an occurrence of an event and a type of the event that has occurred based on a vibration pattern included in the optical signal;

an acquiring procedure of acquiring a detection condition pertaining to a period corresponding to the type of the event identified in the identifying procedure; and a determining procedure of determining that the event identified in the identifying procedure is an anomaly if the detection condition is satisfied.

Supplementary Note 22

The non-transitory computer-readable medium according to Supplementary Note 21, wherein the program causes the computer to further execute a storing procedure of storing, as history information, information including at least the type of the event identified in the identifying procedure, a time of occurrence of the event, a location of the occurrence of the event, content of a vibration when the event occurred, and whether the event is an anomaly into a storage unit, and in a case where an event has been identified in the identifying procedure, the determining procedure includes extracting, from the storage unit, history information regarding the event identified in the identifying procedure and determining whether the detection condition is satisfied based on the extracted history information.

Supplementary Note 23

The non-transitory computer-readable medium according to Supplementary Note 22, wherein the determining procedure includes compressing the history information extracted from the storage unit and determining whether the detection condition is satisfied based on the compressed history information.

Supplementary Note 24

The non-transitory computer-readable medium according to Supplementary Note 22 or 23, wherein the event includes at least a first event and a second event, the detection condition for the first event is a detection condition pertaining to a first period, and the detection condition for the second event is a detection condition pertaining to a second period different from the first period.

Supplementary Note 25

The non-transitory computer-readable medium according to any one of Supplementary Notes 22 to 24, wherein the program causes the computer to further execute a notifying procedure of providing a display, on a display unit, indicating that an anomaly has occurred in a case where the event identified in the identifying procedure has been determined to be an anomaly in the determining procedure.

Supplementary Note 26

The non-transitory computer-readable medium according to Supplementary Note 25, wherein the notifying procedure includes displaying, on the display unit, the type of the event identified in the identifying procedure, the time of occurrence, the location of occurrence, and whether the event is an anomaly.

Supplementary Note 27

The non-transitory computer-readable medium according to Supplementary Note 25, wherein in a case where the same event has been identified over a predetermined period in the identifying procedure, the notifying procedure includes displaying, on the display unit, a graph indicating a change in at least one of a maximum value, a minimum value, a mean value, or a median value of a vibration intensity observed when the event identified in the identifying procedure has occurred.

Supplementary Note 28

The non-transitory computer-readable medium according to Supplementary Note 25, wherein in a case where the same event has been identified over a predetermined period in the identifying procedure, the notifying procedure includes displaying, on the display unit, a graph indicating a change in two or more selected from a maximum value, a minimum value, a mean value, and a median value of a vibration intensity observed when the event identified in the identifying procedure has occurred.

Supplementary Note 29

The non-transitory computer-readable medium according to Supplementary Note 25, wherein in a case where the same event has been identified over a predetermined period in the identifying procedure, the notifying step includes displaying, on the display unit, a graph indicating the number of occurrences per unit period of the event identified in the identifying procedure.

Supplementary Note 30

The non-transitory computer-readable medium according to Supplementary Note 25, wherein in a case where the same event has been identified over a predetermined period in the identifying procedure, the notifying procedure includes superposing a history of a location of occurrence of the event identified in the identifying procedure onto a map and displaying the map on the display unit.

REFERENCE SIGNS LIST 10 optical fiber
20 optical fiber sensing device
21 receiving unit
22 identifying unit
23 acquiring unit
24 determining unit
25 storage unit
26 notifying unit
30 display unit
40 computer
401 processor
402 memory
403 storage
404 input/output interface
4041 display device
4042 input device
4043 audio output device 405 communication interface
F fence
P history of location of occurrence of event

What is claimed is:
1. An optical fiber sensing system comprising:
a receiving unit configured to receive an optical signal from an optical fiber for sensing;
an identifying unit configured to identify an occurrence of an event and a type of the event that has occurred based on a vibration pattern included in the optical signal;
an acquiring unit configured to acquire a detection condition pertaining to a period corresponding to the type of the event identified by the identifying unit;
a determining unit configured to determine that the event identified by the identifying unit is an anomaly if the detection condition is satisfied; and
a storage unit configured to store, as history information, information including at least the type of the event identified by the identifying unit, a time of occurrence of the event, a location of the occurrence of the event, content of a vibration when the event occurred, and whether the event is an anomaly,
wherein in a case where the identifying unit has identified the event, the determining unit extracts, from the storage unit, the history information regarding the event identified by the identifying unit and determines whether the detection condition is satisfied based on the extracted history information.

2. The optical fiber sensing system according to claim 1, wherein the determining unit compresses the history information extracted from the storage unit and determines whether the detection condition is satisfied based on the compressed history information.

3. The optical fiber sensing system according to claim 1, wherein
the event includes at least a first event and a second event,
the detection condition for the first event is a detection condition pertaining to a first period, and
the detection condition for the second event is a detection condition pertaining to a second period different from the first period.

4. The optical fiber sensing system according to claim 1, further comprising:
a display unit; and
a notifying unit configured to provide an indication, on the display unit, that an anomaly has occurred if the determining unit has determined that the event identified by the identifying unit is an anomaly.

5. The optical fiber sensing system according to claim 4, wherein in a case where the identifying unit has identified the same event over a predetermined period, the notifying unit displays, on the display unit, a graph indicating a change in at least one of a maximum value, a minimum value, a mean value, or a median value of a vibration intensity observed when the event identified by the identifying unit has occurred.

6. A monitoring method of monitoring with an optical fiber sensing system, the monitoring method comprising:
a receiving step of receiving an optical signal from an optical fiber for sensing;
an identifying step of identifying an occurrence of an event and a type of the event that has occurred based on a vibration pattern included in the optical signal;
an acquiring step of acquiring a detection condition pertaining to a period corresponding to the type of the event identified in the identifying step;
a determining step of determining that the event identified in the identifying step is an anomaly if the detection condition is satisfied; and
a storing step of storing, as history information, information including at least the type of the event identified in the identifying step, a time of occurrence of the event, a location of occurrence of the event, content of a vibration when the event occurred, and whether the event is an anomaly into a storage unit,
wherein in a case where the event has been identified in the identifying step, the determining step includes extracting, from the storage unit, history information regarding the event identified in the identifying step and determining whether the detection condition is satisfied based on the extracted history information.

7. The monitoring method according to claim 6, wherein the determining step includes compressing the history information extracted from the storage unit and determining whether the detection condition is satisfied based on the compressed history information.

8. The monitoring method according to claim 6, wherein the event includes at least a first event and a second event,
the detection condition for the first event is a detection condition pertaining to a first period, and
the detection condition for the second event is a detection condition pertaining to a second period different from the first period.

9. The monitoring method according to claim 6, further comprising a notifying step of providing an indication, on a display unit, that an anomaly has occurred if the event identified in the identifying step has been determined to be an anomaly in the determining step.

10. The monitoring method according to claim 9, wherein in a case where the same event has been identified over a predetermined period in the identifying step, the notifying step includes displaying, on the display unit, a graph indicating a change in at least one of a maximum value, a minimum value, a mean value, or a median value of a vibration intensity observed when the event identified in the identifying step has occurred.

11. A non-transitory computer-readable medium storing a program that causes a computer to execute:
a receiving procedure of receiving an optical signal from an optical fiber for sensing;
an identifying procedure of identifying an occurrence of an event and a type of the event that has occurred based on a vibration pattern included in the optical signal;
an acquiring procedure of acquiring a detection condition pertaining to a period corresponding to the type of the event identified in the identifying procedure;
a determining procedure of determining that the event identified in the identifying procedure is an anomaly if the detection condition is satisfied; and
a storing procedure of storing, as history information, information including at least the type of the event identified in the identifying procedure, a time of occurrence of the event, a location of occurrence of the event, content of a vibration when the event occurred, and whether the event is an anomaly into a storage unit,
wherein in a case where the event has been identified in the identifying procedure, the determining procedure includes extracting, from the storage unit, history information regarding the event identified in the identifying procedure and determining whether the detection condition is satisfied based on the extracted history information.

12. The non-transitory computer-readable medium according to claim 11, wherein the determining procedure includes compressing the history information extracted from the storage unit and determining whether the detection condition is satisfied based on the compressed history information.

\* \* \* \* \*